(12) United States Patent
Jinnai et al.

(10) Patent No.: US 12,152,661 B2
(45) Date of Patent: Nov. 26, 2024

(54) WORK VEHICLE

(71) Applicant: KUBOTA CORPORATION, Osaka (JP)

(72) Inventors: Atsushi Jinnai, Osaka (JP); Tomonari Tsuchida, Osaka (JP); Ryoma Iwase, Osaka (JP); Tomoyuki Tanaka, Osaka (JP); Takahiro Matsuo, Osaka (JP); Hiroyuki Aikawa, Osaka (JP); Atsuro Hayami, Osaka (JP); Keitaro Morinaga, Osaka (JP); Yosui Nishijima, Osaka (JP); Satoru Nagano, Osaka (JP); Takuma Hokeguchi, Osaka (JP)

(73) Assignee: KUBOTA CORPORATION, Osaka (JP)

(*) Notice: Subject to any disclaimer, the term of this patent is extended or adjusted under 35 U.S.C. 154(b) by 64 days.

(21) Appl. No.: 17/987,327

(22) Filed: Nov. 15, 2022

(65) Prior Publication Data

US 2023/0204096 A1    Jun. 29, 2023

(30) Foreign Application Priority Data

Dec. 24, 2021 (JP) .................................. 2021-210922
Dec. 24, 2021 (JP) .................................. 2021-210923

(51) Int. Cl.
*F16H 57/04*    (2010.01)
*B60K 17/28*    (2006.01)
(Continued)

(52) U.S. Cl.
CPC ......... *F16H 57/0423* (2013.01); *B60K 17/28* (2013.01); *F16H 57/037* (2013.01);
(Continued)

(58) Field of Classification Search
CPC ............... F16H 57/037; F16H 57/0409; F16H 57/0423; F16H 57/0435; F16H 57/0443;
(Continued)

(56) References Cited

U.S. PATENT DOCUMENTS 4,721,184 A * 1/1988 Sowards ................. F16N 29/04
                                                           184/6.12
5,937,697 A * 8/1999 Matsufuji .............. B60K 25/00
                                                           180/53.4
(Continued)

FOREIGN PATENT DOCUMENTS

DE    1047820 B  * 12/1958
FR    2020198 A1    7/1970
(Continued)

OTHER PUBLICATIONS

Machine translation of KR 20120065265 A obtained on Apr. 3, 2024.*

(Continued)

*Primary Examiner* — Adam D Rogers
(74) *Attorney, Agent, or Firm* — Greenblum & Bernstein, P.L.C.

(57) ABSTRACT

There is provided a work vehicle including a partition wall to keep partition between a first space zone as part of an internal space of the transmission case in which a differential mechanism is located and a second space zone as part of the internal space which is adjacent to the first space zone. An upper space is disposed above the partition wall and configured to allow lubricating oil scooped up from the first space zone by a ring gear to flow in the second space zone. A flow-out path is disposed below the upper space and configured to allow the lubricating oil to flow out of the second space zone to the first space zone.

8 Claims, 11 Drawing Sheets

(51) Int. Cl.
*F16H 57/02* (2012.01)
*F16H 57/037* (2012.01)

(52) U.S. Cl.
CPC ..... *F16H 57/0409* (2013.01); *F16H 57/0443* (2013.01); *F16H 57/0445* (2013.01); *F16H 57/0453* (2013.01); *F16H 57/0457* (2013.01); *F16H 57/0483* (2013.01); *B60Y 2200/221* (2013.01); *F16H 2057/02008* (2013.01); *F16H 2057/02052* (2013.01); *F16H 2057/02056* (2013.01)

(58) Field of Classification Search
CPC ............ F16H 57/0445; F16H 57/0453; F16H 57/0457; F16H 57/0483; F16H 2057/02008; F16H 2057/02052; F16H 2057/02056; B60K 17/28; B60Y 2200/221
See application file for complete search history.

(56) References Cited

U.S. PATENT DOCUMENTS

| | | | |
|---|---|---|---|
| 6,044,720 A | | 4/2000 | Matsufuji |
| 6,644,439 B2* | 11/2003 | Schnitzer | ............ F16H 57/0456 184/6.12 |
| 7,878,304 B2* | 2/2011 | Reis | .................. F16H 57/0447 184/6.12 |
| 9,772,026 B2* | 9/2017 | Fast | .................... F16H 57/0423 |
| 9,920,828 B2* | 3/2018 | Fast | .................... F16H 57/0412 |
| 11,181,181 B1* | 11/2021 | Zhou | .................... F16H 57/0413 |
| 2007/0169583 A1 | 7/2007 | Reis et al. | |
| 2016/0377164 A1 | 12/2016 | Fast et al. | |
| 2017/0370465 A1 | 12/2017 | Fast et al. | |

FOREIGN PATENT DOCUMENTS

| | | | | |
|---|---|---|---|---|
| JP | S 62-121469 U | | 8/1987 | |
| JP | 2002257214 A | * | 9/2002 | ........... F16H 57/027 |
| JP | 2002-295647 A | | 10/2002 | |
| JP | 2007-514905 A | | 6/2007 | |
| JP | 2008051176 A | * | 3/2008 | ......... F16H 57/0421 |
| JP | 4701820 B2 | | 6/2011 | |
| JP | 2014119084 A | * | 6/2014 | |
| JP | 6332360 B2 | | 5/2018 | |
| KR | 20120065265 A | * | 6/2012 | |

OTHER PUBLICATIONS

European Search report issued May 17, 2023 in European family member application No. 22 21 0386.3.
Notice of Reasons for Refusal in counterpart Japanese Application No. JP2021-210922, dated Jul. 30, 2024 (and translation thereof).
Notice of Reasons for Refusal in counterpart Japanese Application No. JP2021-210923, dated Jul. 30, 2024 (and translation thereof).

* cited by examiner

WORK VEHICLE

TECHNICAL FIELD

The present invention relates to a work vehicle.

BACKGROUND ART

There are some work vehicles including a transmission case that contains therein a gear transmission and a differential mechanism. The gear transmission varies power from a power source and outputs the power. The differential mechanism includes a ring gear rotatable around a rotation axis along a horizontal direction, and transmits the power inputted from the gear transmission to a traveling device.

The differential mechanism stirs a lubricating oil during operation in the transmission case. During that time, the differential mechanism is lubricated with the lubricating oil, and receives resistance from the lubricating oil by stirring the lubricating oil. There are cases where a large amount of the lubricating oil stays in the transmission case and the differential mechanism enters deeply in the lubricating oil in the transmission case. The differential mechanism stirs the lubricating oil at a low-speed rotation during low-speed traveling, and therefore, the differential mechanism is not subjected to high resistance due to the stirring of the lubricating oil. An advantage that the differential mechanism is lubricated by entering deeply in the lubricating oil is greater than a disadvantage that the differential mechanism is subjected to the resistance. Accordingly, the differential mechanism preferably enters deeply in the lubricating oil in the transmission case during low-speed traveling. In contrast, if the differential mechanism enters deeply in the lubricating oil during high-speed traveling, the differential mechanism stirs the lubricating oil at high-speed rotation, resistance exerted on the differential mechanism due to the stirring of the lubricating oil grows stronger, causing large loss of driving force. Hence, the differential mechanism preferably enters shallowly in the lubricating oil during the high-speed traveling.

A lubrication device of powertrain discussed in Patent Literature 1 includes an oil pump to supply an oil to a differential chamber, a pipe to connect an oil pan of a gear case and a lower portion of the differential chamber, and a valve disposed in the pipe. With the valve closed, the oil supplied to the differential chamber remains in the lower portion of the differential chamber. With the valve opened, it is configured so that the oil remaining in the lower portion of the differential chamber can flow out to the oil pan. An oil surface of the differential chamber when a vehicle speed is high is kept lower than that when the vehicle speed is low by opening and closing the valve.

CITATION LIST

Patent Literature

Patent Literature 1 Japanese Patent No. 4701820

SUMMARY OF INVENTION

Technical Problem

The lubrication device tends to have a complicated structure because a conventional lubrication technology needs the oil pump and the valve.

The present invention provides a work vehicle in which the differential mechanism can enter deeply in the lubricating oil during the low-speed traveling, and the differential mechanism can enter shallowly in the lubricating oil during the high-speed traveling even by a lubrication device having a simple structure.

Solution to Problem

A work vehicle in an embodiment of the present invention includes a gear transmission, a differential mechanism, a transmission case, a first space zone, a second space zone, a partition wall, an upper space and a flow-out path. The gear transmission is configured to vary power from a power source and output the power. The differential mechanism includes a ring gear rotatable around a rotation axis along a horizontal direction, and is configured to transmit the power inputted from the gear transmission to a traveling device. The transmission case contains the gear transmission and the differential mechanism. There are the first space zone as part of an internal space of the transmission case in which the differential mechanism is located, and the second space zone as part of the internal space which the second space zone is adjacent to the first space zone. The partition wall separates the first space zone and the second space zone from each other. The upper space is disposed above the partition wall and configured to allow lubricating oil scooped up from the first space zone by rotation of the ring gear to flow in the second space zone. The flow-out path is disposed below the upper space and configured to allow the lubricating oil staying in the second space zone to flow out to the first space zone.

The ring gear rotates at lower speeds during the low-speed traveling than during the high-speed traveling, thereby decreasing the amount of the lubricating oil which is scooped up by the ring gear from the first space zone and flows through the upper space into the second space zone. The ring gear rotates at higher speeds during the high-speed traveling than during the low-speed traveling, thereby increasing the amount of the lubricating oil which is scooped up by the ring gear from the first space zone and flows through the upper space into the second space zone. In this embodiment, a circulation area of the flow-out path is preset so that the amount of the lubricating oil flowing out of the second space zone through the flow-out path to the first space zone can reach an appropriate amount. Thereby, the amount of the lubricating oil staying in the second space zone during the low-speed traveling becomes smaller than that during the high-speed traveling. This makes it possible to increase the position of the oil surface of the lubricating oil in the first space zone. In contrast, the amount of the lubricating oil staying in the second space zone during the high-speed traveling becomes larger than during the low-speed traveling. This makes it possible to decrease the position of the oil surface of the lubricating oil in the first space zone. That is, the differential mechanism can enter deeply in the lubricating oil during the low-speed traveling, and the differential mechanism can enter shallowly in the lubricating oil during the high-speed traveling. Additionally, the ring gear is usable as a pump that transfers the lubricating oil in the first space zone to the second space zone, and the lubricating oil can flow out of the second space zone to the first space zone by a head difference of the lubricating oil, thus leading to a simple structure of the lubrication device.

The present invention preferably includes an area adjustment part configured to adjust a circulation area of the flow-out path.

With this configuration, the circulation area of the flow-out path is adjusted so that the amount of the lubricating oil flowing out of the second space zone through the flow-out path to the first space zone can reach the appropriate amount. With this configuration, the amount of the lubricating oil staying in the second space zone during the low-speed traveling becomes smaller than that during the high-speed traveling. This makes it possible to increase the position of the oil surface of the lubricating oil in the first space zone. In contrast, the amount of the lubricating oil staying in the second space zone during the high-speed traveling becomes larger than that during the low-speed traveling. This makes it possible to decrease the position of the oil surface of the lubricating oil in the first space zone. Even if viscosity of the lubricating oil changes due to, for example, a temperature change of the lubricating oil and a change of the lubrication oil to be used, the circulation area of the flow-out path can be adjusted by the area adjustment part. Consequently, the amount of the lubricating oil flowing out of the second space zone through the flow-out path to the first space zone can be adjusted to an appropriate amount. That is, the differential mechanism can enter deeply in the lubricating oil during the low-speed traveling, and the differential mechanism can enter shallowly in the lubricating oil during the high-speed traveling. Additionally, the ring gear is usable as a pump that transfers the lubricating oil in the first space zone to the second space zone, and the lubricating oil can flow out of the second space zone to the first space zone by a head difference of the lubricating oil, thus leading to a simple structure of the lubrication device.

The present invention preferably includes a wall adjustment part configured to adjust lifting and lowering of an upper portion of the partition wall.

With this configuration, by adjusting the upper portion of the partition wall to a lifting side by the wall adjustment part, the position of the upper portion of the partition wall can be increased to obtain a large volume of space where the lubricating oil can stay in the second space zone. By adjusting the upper portion of the partition wall to a lowering side by the wall adjustment part, the position of the upper portion of the partition wall can be lowered so that the lubricating oil scooped up by the ring gear can easily climb over the partition wall. Even if the amount of the lubricating oil scooped up by the ring gear during the high-speed traveling in which the ring gear has a higher rotation speed is larger than that during the low-speed traveling, an appropriate amount of the lubricating oil can flow in the second space zone so as to appropriately maintain the height of the oil surface of the lubricating oil in the first space zone by adjusting the upper portion of the partition wall to the lifting side. In contrast, even if the height of scooping up of the lubricating oil scooped up by the ring gear during the low-speed traveling in which the ring gear has a low rotation speed is lower than that during the high-speed traveling, by adjusting the upper portion of the partition wall to the lowering side, the lubricating oil scooped up can easily flow in the second space zone so as to stay in the second space zone, thereby lowering the height of the oil surface of the lubricating oil in the first space zone.

The present invention preferably includes a first guide part, which is disposed in a vertically-directed attitude between the ring gear and the partition wall, and is configured to guide the lubricating oil stirred by the ring gear toward above the partition wall.

With this configuration, the lubricating oil scooped up by the ring gear is guided so as to flow toward the above the partition wall by the first guide part. Therefore, the lubricating oil scooped up by the ring gear can easily flow in the second space zone.

The present invention preferably includes a second guide part, which is disposed below the ring gear in a state of extending in a rotation direction of the ring gear, and is configured to guide the lubricating oil stirred by the ring gear toward the first guide part. An end portion of the second guide part which the end portion is located in a downstream side in the rotation direction of the ring gear is preferably connected to a lower end portion of the first guide part.

With this configuration, the lubricating oil stirred below the ring gear is guided so as to flow toward the first guide part by the second guide part, and the lubricating oil flowing toward the first guide part does not leak from between the second guide part and the first guide part. Hence, the lubricating oil stirred below the ring gear can easily flow in the second space zone.

The present invention preferably includes a third guide part disposed, in a state in which the third guide part extends in the rotation direction of the ring gear, at a position opposed to one of two lateral portions in a lower portion of the ring gear which the lateral portion is located on a side on which a tooth part of the ring gear is located. The third guide part is preferably configured to guide the lubricating oil stirred by the ring gear toward the first guide part. An end portion of the third guide part which the end portion is located toward the second guide part is preferably connected to a lateral end portion of the second guide part which the lateral end portion is located toward the third guide part. An end portion of the third guide part which is located on a downstream side of the rotation direction of the ring gear is preferably connected to a lateral end portion of the first guide part which the lateral end portion is located toward the third guide part.

With this configuration, the lubricating oil stirred below the ring gear can be guided so as to flow toward the first guide part by the second guide part and the third guide part without leaking from between the second guide part and the third guide part, and the lubricating oil flowing toward the first guide part does not leak from between the second guide part and the first guide part and between the third guide part and the first guide part. Hence, the lubricating oil stirred below the ring gear can easily flow in the second space zone.

The partition wall is preferably disposed in an inclined attitude to guide the lubricating oil stirred by the ring gear toward the second space zone in the present invention.

With this configuration, the partition wall has a guide function to cause the lubricating oil to flow toward the second space zone. Therefore, the partition wall is usable as a guide member to facilitate the flow of the lubricating oil into the second space zone.

The present invention preferably includes an oil feeding part disposed separately from a tooth part in the ring gear and configured to feed the lubricating oil staying in the first space zone toward the second space zone.

With this configuration, the lubricating oil tends to flow in the second space zone because the lubricating oil staying in the first space zone is also fed to the second space zone by the oil feeding part in addition to the tooth part of the ring gear.

The present invention preferably includes a clutch disposed in an upper portion of the second space zone and configured to switch between an on state in which the power from the power source is transmitted to a power take-off shaft, and an off state in which the power transmission from the power source to the power take-off shaft is discontinued.

With this configuration, the clutch is cooled by the lubricating oil, and the lubricating oil dripping from the clutch enters the second space zone and flows out of the second space zone via the flow-out path to the first space zone. It is therefore possible to lubricate the differential mechanism without any special lubrication circuit for the differential mechanism.

The present invention preferably includes a gear interlock mechanism disposed in the second space zone and configured to interlock the clutch and the power take-off shaft.

With this configuration, the lubricating oil is fed by the ring gear, and the gear interlock mechanism is located in the second space zone to which the lubricating oil is supplied from the clutch. It is therefore possible to supply the lubricating oil to the gear interlock mechanism without any special lubrication circuit for the gear interlock mechanism.

DESCRIPTION OF EMBODIMENTS

An embodiment of the present invention is described with reference to the drawings.

Figure 1:
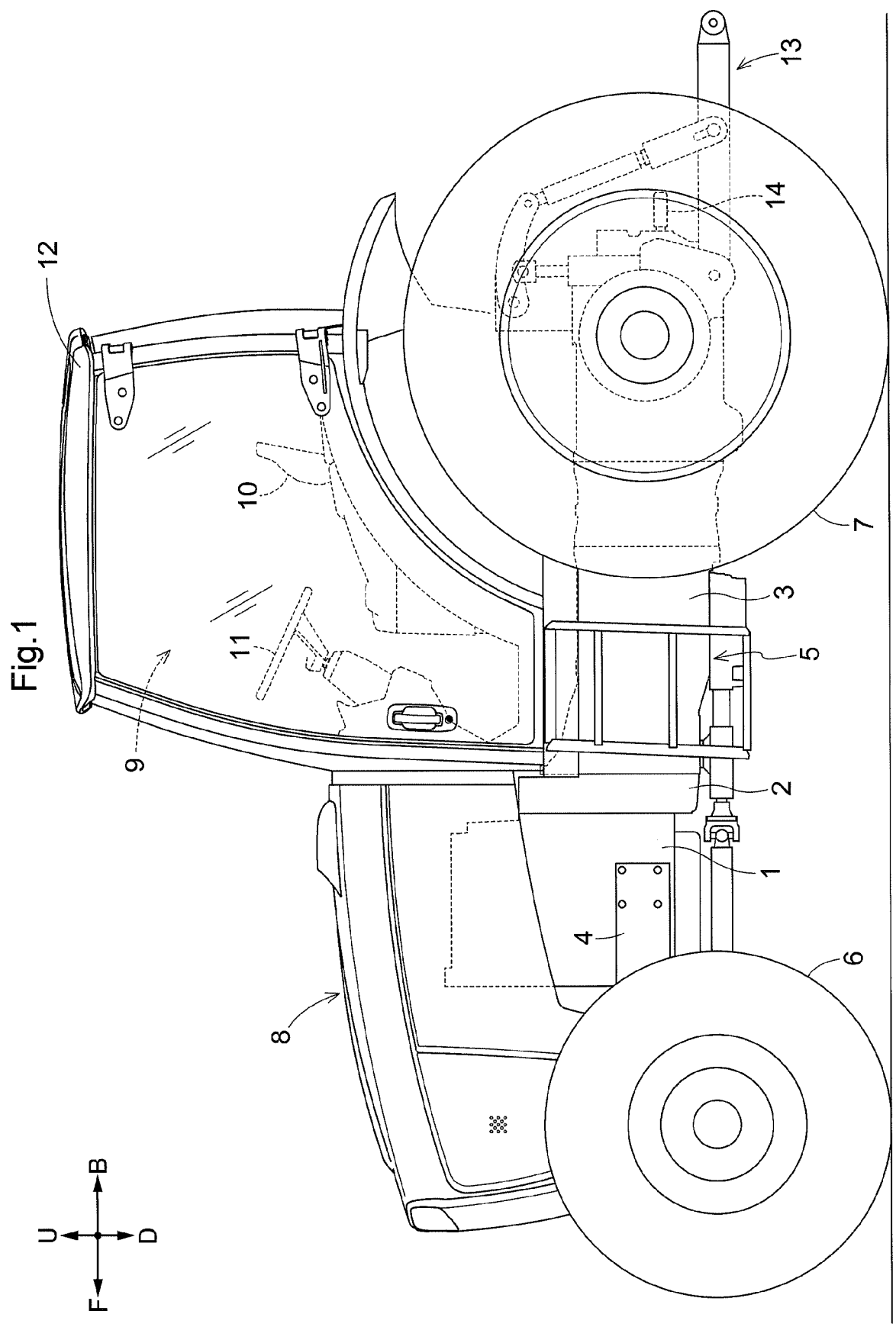
FIG. 1 is a side view illustrating an entirety of a tractor.
Figure 4:
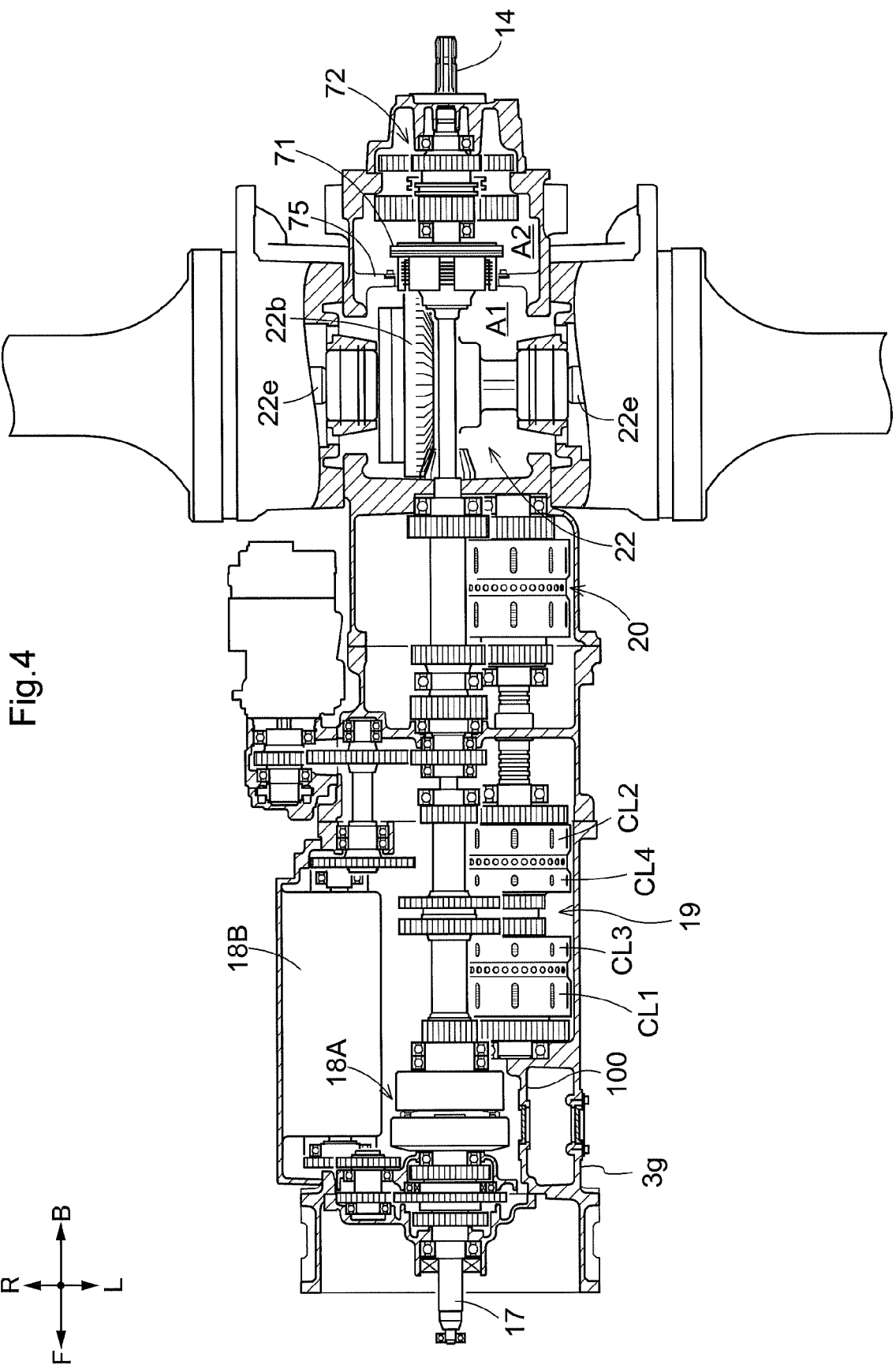
FIG. 4 is a sectional view of a transmission case.
Figure 5:
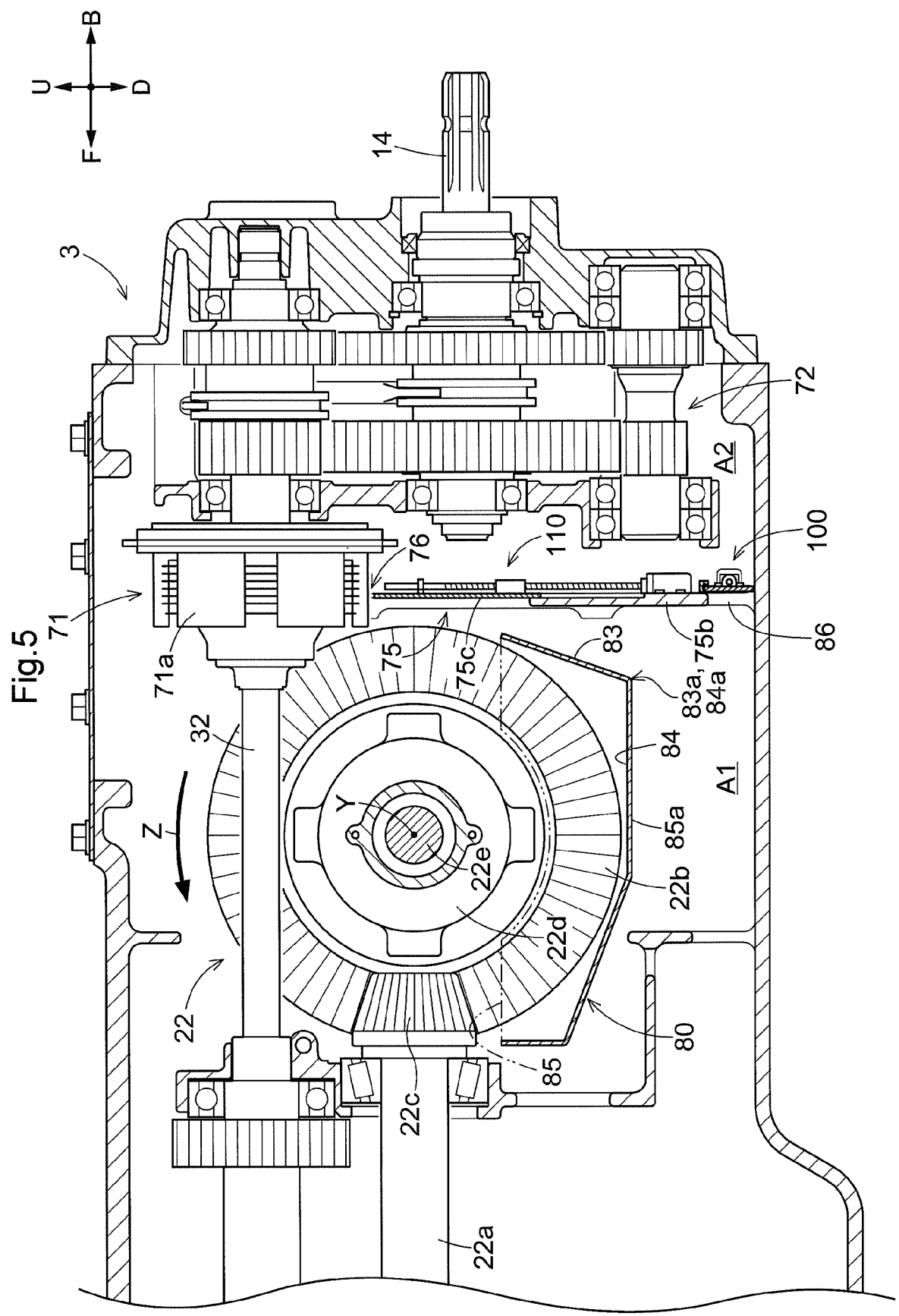
FIG. 5 is a side view illustrating a ring gear, a partition wall, an upper space and a flow-out path.

The following description relates to a traveling vehicle body of a tractor (an example of "work vehicles"). In FIGS. 1, 4 and 5, and the like, a direction of an arrow F is "front vehicle body," a direction of an arrow B is "rear vehicle body," a direction of an arrow U is "above vehicle body," a direction of an arrow D is "below vehicle body," a direction of an arrow L is "left vehicle body" and a direction of an arrow R is "right vehicle body."

[Overall Configuration of Tractor]

As illustrated in FIG. 1, the traveling vehicle body of the tractor includes an engine 1, a transmission case 3, a vehicle body frame 5, a pair of left and right front wheels 6 and a pair of left and right rear wheels 7. A front portion of the transmission case 3 is connected to a flywheel housing 2 disposed in a rear portion of the engine 1. The vehicle body frame 5 is configured by, for example, a front frame 4 connected to a lower portion of the engine 1. The front wheels 6 are traveling devices disposed at a front portion of the vehicle body frame 5 so as to be steerably and drivably.

The rear wheels 7 are traveling device disposed drivably at a rear portion of the vehicle body frame 5. The tractor includes a driving section 8, which includes the engine 1, which is disposed at a front portion of the traveling vehicle body. The tractor includes an operation section 9 at a rear portion of the traveling vehicle body. The operation section 9 includes an operation seat 10, a steering wheel 11 to perform steering operation of the front wheels 6, and a cabin 12 to cover a boarding space. The tractor includes a link mechanism 13 and a power take-off shaft 14. The link mechanism 13 connects various types of working devices, such as a rotary tiller (not illustrated), to a rear portion of the vehicle body frame 5 so that they can be subjected to a lifting operation. The power take-off shaft 14 transmits power from the engine 1 to the working devices being connected.

[Power Transmission Device]

Figure 2:
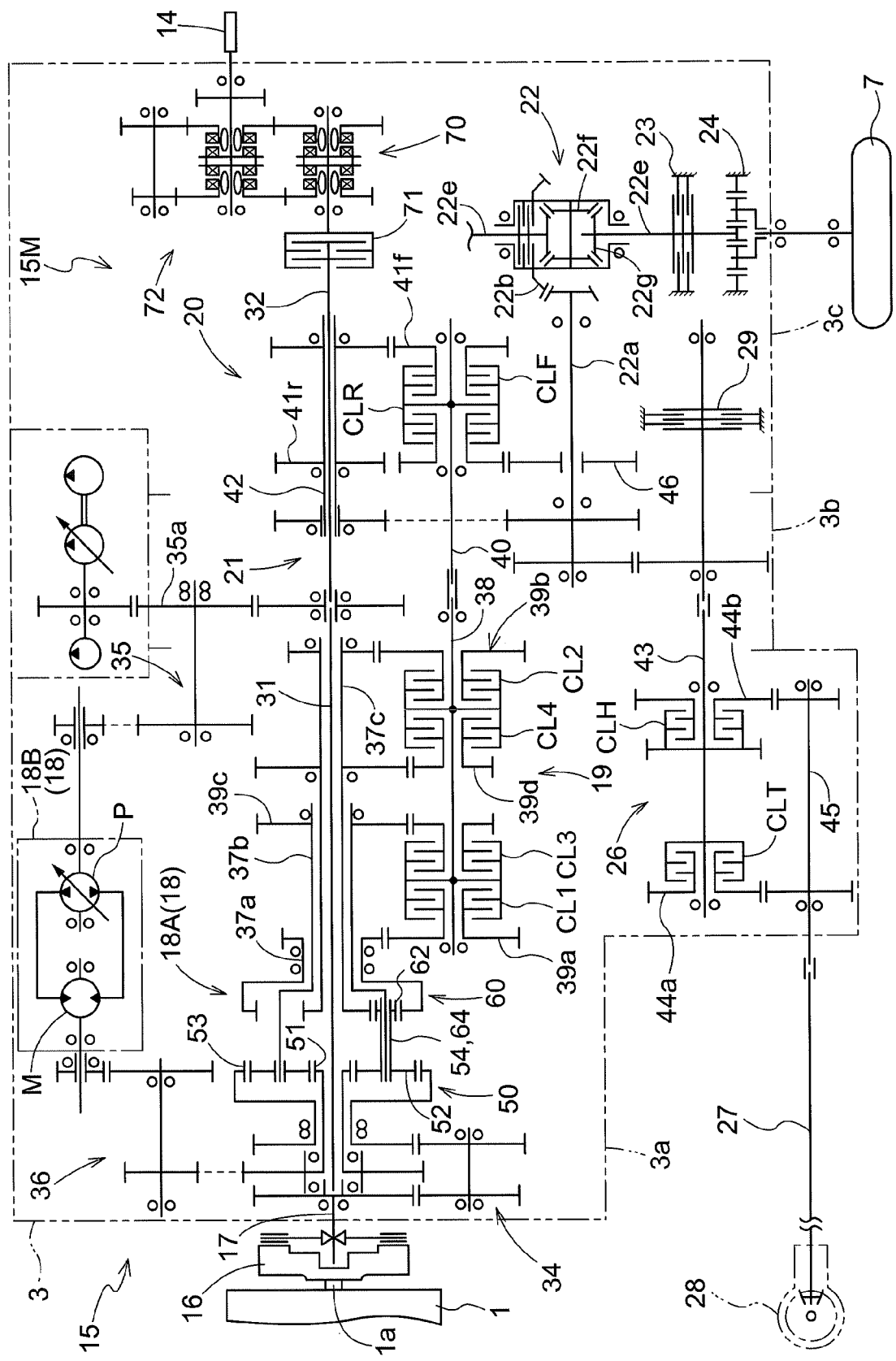
FIG. 2 is a diagram of a power transmission device.

FIG. 2 is a diagram illustrates a power transmission device 15. The power transmission device 15 transmits the power of the engine 1 to the front wheels 6, the rear wheels 7, and the power take-off shaft 14. As illustrated in FIGS. 1 and 2, the power transmission device 15 includes the transmission case 3 whose front portion is connected to the flywheel housing 2 disposed in the rear portion of the engine 1. The transmission case 3 is disposed in the traveling vehicle body in a state in which a front-hack direction of the transmission case 3 coincides with a front-back direction of the traveling vehicle body as illustrated in FIG. 1. The transmission case 3 is configured so as to be divisible into a front case part 3a, an intermediate case part 3b, and a rear case part 3c. A front portion of the front case part 3a is connected to the flywheel housing 2. The intermediate case part 3b is connected to a rear portion of the front case part 3a. A front portion of the rear case part 3c is connected to a rear portion of the intermediate case part 3b.

As illustrated in FIG. 2, the transmission case 3 contains therein a gear transmission 15M, to which the power from the engine 1, which is a power source, is inputted, which varies the power, and from which the varied power varied is outputted to the front wheels 6 and the rear wheels 7; a rear wheel differential mechanism 22 (corresponding to the differential mechanism); and an operation power transmission device 70, which transmits the power from the engine 1 to the power take-off shaft 14.

The gear transmission 15M includes an input shaft 17, a major transmission section 18, a staged transmission section 19, a forward-reverse switching device 20, a first gear interlock mechanism 21, and a front wheel transmission device 26 as illustrated in FIG. 2. Power of an output shaft 1a of the engine 1 is transmitted via a major clutch 16 to the input shaft 17, and the input shaft 17 inputs the transmitted power to the transmission case 3. The major transmission section 18 is connected to the input shaft 17. Output of the major transmission section 18 is inputted to the staged transmission section 19. Output of the staged transmission section 19 is inputted to the forward-reverse switching device 20. The first gear interlock mechanism 21 transmits output of the forward-reverse switching device 20 to the rear wheel differential mechanism 22. The output of the forward-reverse switching device 20 is transmitted via the first gear interlock mechanism 21 to the front wheel transmission device 26.

The major transmission section 18 includes a planetary gear device 18A and a continuously variable transmission device 18B as illustrated in FIG. 2.

The planetary gear device 18A includes two planetary gear device sections disposed side by side in the front-back direction of the transmission case 3. Hereinafter, a description is given where one of these two planetary gear device sections which is disposed on a front side is referred to as a first planetary gear device section 50, and one of these two planetary gear device sections which is disposed on a rear side is referred to as a second planetary gear device section 60.

The first planetary gear device section 50 includes a planetary gear 52, a transmission gear (not illustrated) that meshes with the planetary gear 52. The second planetary gear device section 60 includes a planetary gear 62. A coupling member (not illustrated) that interlockingly couples the transmission gear and the planetary gear 62 is disposed across the first planetary gear device section 50 and the second planetary gear device section 60. A carrier 54 of the first planetary gear device section 50 and a carrier 64 of the second planetary gear device section 60 are integrally rotatably coupled to each other. With this configuration, the planetary gear device 18A is configured as a complex planetary gear device.

The continuously variable transmission device 18B is configured by a hydrostatic continuously variable transmission device and includes a variable displacement hydraulic pump P and a hydraulic motor M.

Power of the input shaft 17 is inputted via a front rotating shaft 31 and a second gear interlock mechanism 35 to the hydraulic pump P in the major transmission section 18. By performing a gear shift operation to change a swash plate angle of the hydraulic pump P in the continuously variable transmission device 18B, the inputted power is shifted to forward rotation power and reverse rotation power, and the forward rotation power and the reverse rotation power are shifted steplessly. The shifted power is outputted from the hydraulic motor M. Output of the continuously variable transmission device 18B is inputted via a third gear interlock mechanism 36 to a sun gear 51 of the first planetary gear device section 50. Power of the input shaft 17 is inputted via a fourth gear interlock mechanism 34 to an internal gear 53 of the first planetary gear device section 50. Power transmitted from the engine 1 via the continuously variable transmission device 18B, and power transmitted from the engine 1 not via the continuously variable transmission device 18B are synthesized by the first planetary gear device section 50 and the second planetary gear device section 60 in the planetary gear device 18A. Synthetic power is outputted from a first output shaft 37*a*, a second output shaft 37*b*, and a third output shaft 37*c* included in the second planetary gear device section 60.

[Staged Transmission Section]

The staged transmission section 19 includes four staged clutches to which the synthetic power from the planetary gear device 18A, and an output shaft 38 as illustrated in FIG. 2. These four staged clutches are a first clutch CL1, a second clutch CL2, a third clutch CL3, and a fourth clutch CL4 illustrated in FIG. 2, which are disposed on the output shaft 38.

The synthetic power from the planetary gear device 18A is staged in four speed ranges and then outputted from the output shaft 38 by appropriate operations of the continuously variable transmission device 18B and the four staged clutches (the first clutch CL1, the second clutch CL2, the third clutch CL3 and the fourth clutch CL4) in the staged transmission section 19.

Figure 3:
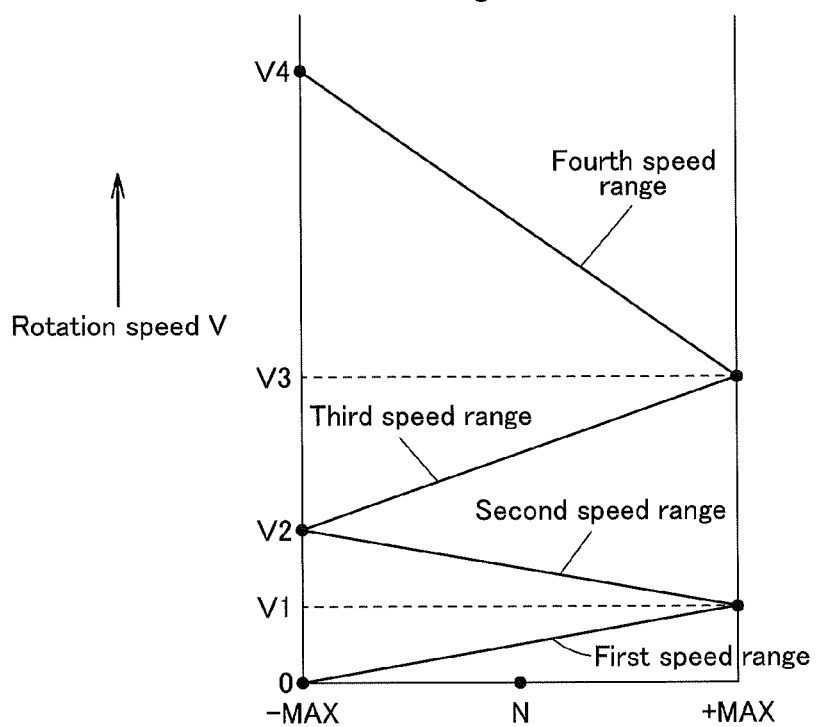
FIG. 3 is an explanatory drawing illustrating a relationship among a transmission state of a continuously variable transmission, a speed range, and a rotational velocity of an output shaft of a staged transmission.

FIG. 3 is an explanatory drawing illustrating a relationship among a speed change state of the continuously variable transmission device 18B, a speed range and a rotational velocity V of the output shaft 38 of the staged transmission section 19. An ordinate in FIG. 3 represents the rotational velocity V of the output shaft 38. An abscissa in FIG. 3 represents the speed change state of the continuously variable transmission device 18B, in which "N" represents a neutral state, "−MAX" represents a speed change state at a maximum speed in a reverse rotation direction, and "+MAX" represents a speed change state at a maximum speed in a forward rotation direction.

If the first clutch CL1 of the four staged clutches is brought into an engaged state and the continuously variable transmission device 18B is subjected to a gear shift operation, the power of the first output shaft 37*a* is varied by a first speed gear interlock mechanism 39*a* and the first clutch CL1, and the varied power is outputted from the output shaft 38. As illustrated in FIG. 3, the rotational velocity V of the output shaft 38 reaches a rotational velocity of a first speed range, and the rotational velocity V of the output shaft 38 increases steplessly from a velocity "0" to the maximum velocity "V1" of the first speed range along with a shift from "−MAX" to "+MAX" in the continuously variable transmission device 18B.

If the second clutch CL2 of the four staged clutches is brought into an engaged state and the continuously variable transmission device 18B is subjected to a gear shift operation, the power of the third output shaft 37*c* is varied by a second speed gear interlock mechanism 39*b* and the second clutch CL2, and the varied power is outputted from the output shaft 38. As illustrated in FIG. 3, the rotational velocity V of the output shaft 38 reaches a higher rotational velocity of a second speed range than the first speed range, and the rotational velocity V of the output shaft 38 increases steplessly from a minimum velocity "V1" of the second speed range to the maximum velocity "V2" of the second speed range along with a shift from "+MAX" to "−MAX" in the continuously variable transmission device 18B.

If the third clutch CL3 of the four staged clutches is brought into an engaged state and the continuously variable transmission device 18B is subjected to a gear shift operation, the power of the second output shaft 37*b* is varied by a third speed gear interlock mechanism 39*c* and the third clutch CL3, and the varied power is outputted from the output shaft 38. As illustrated in FIG. 3, the rotational velocity V of the output shaft 38 reaches a higher-side rotational velocity of a third speed range than the second speed range, and the rotational velocity V of the output shaft 38 increases steplessly from a minimum velocity "V2" of the third speed range to the maximum velocity "V3" of the third speed range along with a shift from "−MAX" to "+MAX" in the continuously variable transmission device 18B.

If the fourth clutch CL4 of the four staged clutches is brought into an engaged state and the continuously variable transmission device 18B is subjected to a gear shift operation, the power of the third output shaft 37*c* is varied by the fourth speed gear interlocking mechanism 39*d* and the fourth clutch CL4, and the varied power is outputted from the output shaft 38. As illustrated in FIG. 3, the rotational velocity V of the output shaft 38 reaches a higher-side rotational velocity of a fourth speed range than the third speed range, and the rotational velocity V of the output shaft 38 increases steplessly from a minimum velocity "V3" of the fourth speed range to the maximum velocity "V4" of the fourth speed range along with a shift from "+MAX" to "−MAX" in the continuously variable transmission device 18B.

[Forward-Reverse Switching Device]

As illustrated in FIG. 2, the forward-reverse switching device 20 includes an input shaft 40, which is connected to the output shaft 38 of the staged transmission section 19; a forward clutch CLF and a reverse clutch CLR, which are disposed on the input shaft 40; and an output shaft 42. The output shaft 42 is connected via a forward gear mechanism 41*f* to the forward clutch CLF, and is connected via a reverse gear mechanism 41*r* to the reverse clutch CLR. As illustrated in FIG. 2, the reverse gear mechanism 41*r* includes a reverse gear 46 configured to mesh with a tooth part of an output rotary member of the reverse clutch CLR. The reverse gear 46 is relatively rotatably supported on an input shaft 22*a* of the rear wheel differential mechanism 22.

In the forward-reverse switching device 20, if the forward clutch CLF is brought into an engaged state, power transmitted from the staged transmission section 19 to the input shaft 40 is converted to forward movement power by the forward clutch CLF and the forward gear mechanism 41*f*, and the forward movement power is outputted from the output shaft 42. If the reverse clutch CLR is brought into an engaged state, power transmitted from the staged transmission section 19 to the input shaft 40 is converted to reverse movement power by the reverse clutch CLR and the reverse gear mechanism 41*r*, and the reverse movement power is outputted from the output shaft 42. The forward movement power and the reverse movement power outputted from the output shaft 42 are transmitted to the first gear interlock mechanism 21 and are then transmitted to the input shaft 22*a* of the rear wheel differential mechanism 22 by the first gear interlock mechanism 21.

[Rear Wheel Differential Mechanism]

The forward movement power and the reverse movement power outputted from the forward reverse switching device 20 are inputted via the first gear interlock mechanism 21 to the input shaft 22*a*, and the rear wheel differential mechanism 22 outputs the inputted powers to the left and right rear wheels 7. Output of the rear wheel differential mechanism 22 is transmitted via a reduction device 24 to the rear wheels 7. The reduction device 24 is configured by a planetary gear device. A steering brake 23 is disposed on a transmission system from the rear wheel differential mechanism 22 to the rear wheels 7.

[Front Wheel Transmission Device]

The front wheel transmission device 26 includes an input shaft 43, a constant velocity clutch CLT and a speed-up clutch CLH, which are disposed on the input shaft 43, and an output shaft 45 as illustrated in FIG. 2. The forward movement power and the reverse movement power from the forward reverse switching device 20 are transmitted via the first gear interlock mechanism 21 to the input shaft 43. The output shaft 45 is connected via a constant velocity gear mechanism 44*a* to the constant velocity clutch CLT, and is connected via a speed-up gear mechanism 44*b* to the speed-up clutch CLH. A parking brake 29 is connected to the input shaft 43.

If the constant velocity clutch CLT is brought into an engaged state in the front wheel transmission device 26, power transmitted from the forward reverse switching device 20 to the input shaft 43 is transmitted via the constant velocity clutch CLT and the constant velocity gear mechanism 44*a* to the output shaft 45, and the power is transmitted from the output shaft 45 via a rotating shaft 27 to the front wheel differential mechanism 28. This leads to a situation where the pair of left and right front wheels 6 and the pair of left and right rear wheels 7 are driven in a state in which an average peripheral speed of the pair of left and right front wheels 6 is approximately equal to an average peripheral speed of the pair of left and right rear wheels 7, namely, a so-called four-wheel drive state at an equal velocity of the front and rear wheels. If the speed-up clutch CLH is brought into an engaged state, power transmitted from the forward reverse switching device 20 to the input shaft 43 is transmitted via the speed-up clutch CLH and the speed-up gear mechanism 44*b* to the output shaft 45, and the power is transmitted from the output shaft 45 to the front wheel differential mechanism 28. This leads to a situation where the pair of left and right front wheels 6 and the pair of left and right rear wheels 7 are driven in a state in which the average peripheral speed of the pair of left and right front wheels 6 is higher than the average peripheral speed of the pair of left and right rear wheels 7, specifically, a so-called four-wheel drive state in which the front wheels have a higher speed.

[Operation Power Transmission Device]

The operation power transmission device 70 is connected via the front rotating shaft 31 and a rear rotating shaft 32 to the input shaft 17 as illustrated in FIG. 2. The operation power transmission device 70 includes an operation clutch 71 (corresponding to a clutch) to which power from the engine 1 is inputted, and an operation power transmission mechanism 72 (corresponding to a gear interlock mechanism) that varies the output of the operation clutch 71 and transmits the output to the power take-off shaft 14. The front rotating shaft 31 is disposed behind the input shaft 17 so as to be located on the same straight line as the input shaft 17. The rear rotating shaft 32 is disposed behind the front rotating shaft 31 so as to be located on the same straight line as the front rotating shaft 31.

The operation clutch 71 in the operation power transmission device 70 performs switching between a state in which the power from the engine 1 is transmitted to the power take-off shaft 14 and a state in which a power transmission from the engine 1 to the power take-off shaft 14 is discontinued. That is, if the operation clutch 71 is switched to an engaged state, the rear rotating shaft 32 and the operation power transmission mechanism 72 are interlockingly connected to each other by the operation clutch 71, so that the power from the input shaft 17 is transmitted to the power take-off shaft 14. If the operation clutch 72 is switched to a disengaged state, the interlocking connection between the rear rotating shaft 32 and the operation power transmission mechanism 72 is disconnected by the operation clutch 71, so that the power transmission from the input shaft 17 to the power take-off shaft 14 is disconnected.

[Lubrication Device of Rear Wheel Differential Mechanism]

As illustrated in FIG. 4, the rear wheel differential mechanism 22 is contained in a rear portion of the transmission case 3. As illustrated in FIGS. 2, 4, 5 and 7, the rear wheel differential mechanism 22 includes an input shaft 22*a* located at a front portion of the rear wheel differential mechanism 22, and a ring gear 22*b* engaged with an input gear 22*c* included in the input shaft 22*a*. Power of the input shaft 22*a* is transmitted via the input gear 22*c* to the ring gear 22*b*, and the ring gear 22*b* is rotationally driven around a rotation axis Y along a horizontal direction. In the present embodiment, the ring gear 22*b* is rotationally driven around the rotation axis Y along a vehicle body lateral width direction. A differential case 22*d* is connected to the ring gear 22*b*. Left and right output shafts 22*e* are extended from the differential case 22*d*. The differential case 22*d* includes therein a differential pinion 22*f* and a side gear 22*g* that transmit power of the ring gear 22*b* to the left and right output shafts 22*e*.

Figure 6:
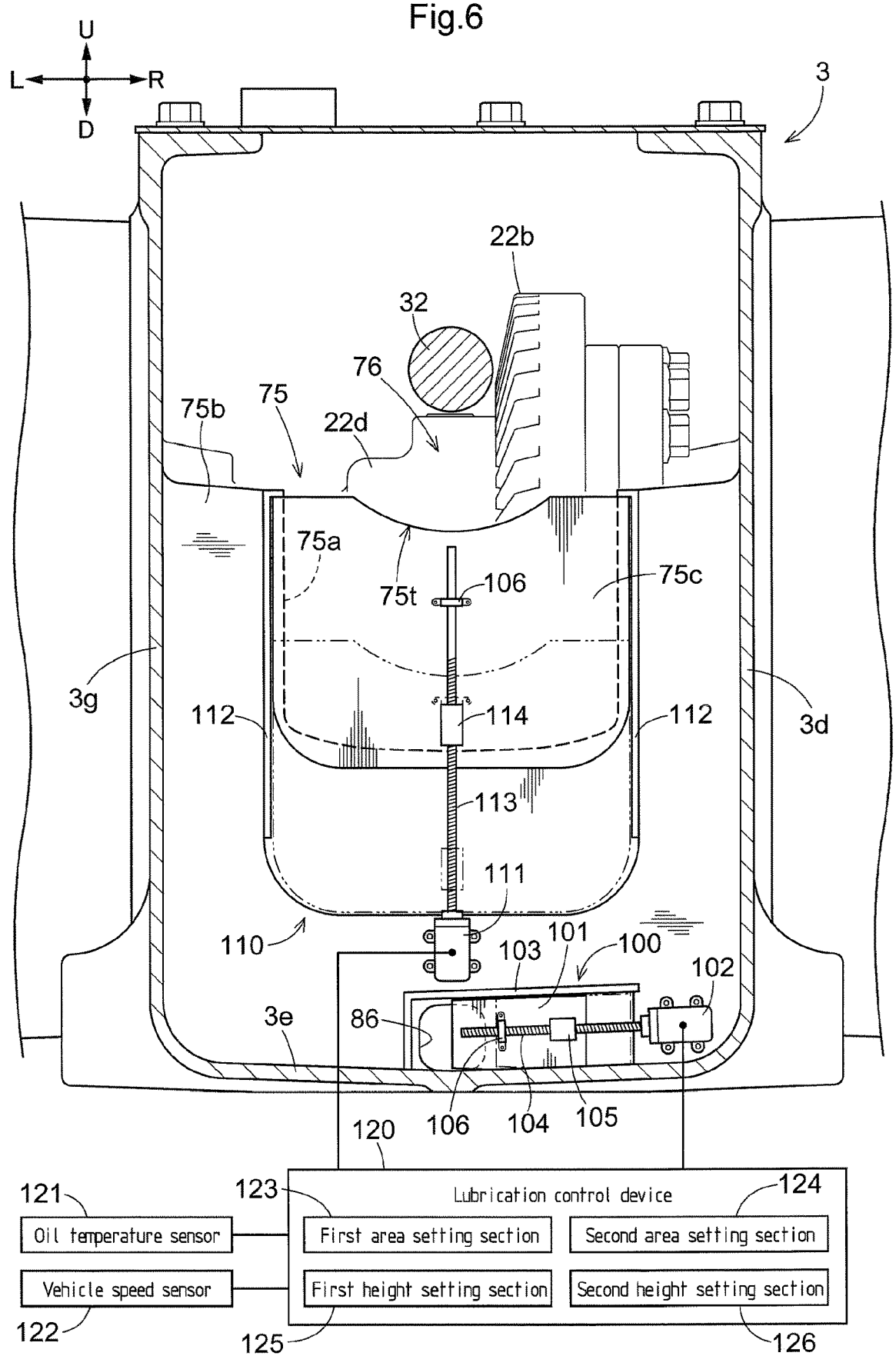
FIG. 6 is a rear view illustrating the partition wall, the upper space and the flow-out path.

As illustrated in FIGS. 4 and 5, a partition wall 75 is disposed at a portion of an inner side of the transmission case 3 which is displaced in a direction orthogonal to the rotation axis Y and in a direction along the horizontal direction with respect to the ring gear 22b. In the present embodiment, the partition wall 75 is disposed at a portion behind the ring gear 22b in the inner portion of the transmission case 3. As illustrated in FIG. 6, the partition wall 75 is connected to a left sidewall portion 3g, a right sidewall portion 3d and a bottom wall portion 3e in the transmission case 3. As illustrated in FIG. 5, a first space zone A1 as part of an internal space of the transmission case 3 in which first space zone A1 the rear wheel differential mechanism 22 is located, and a second space zone A2 as part of the internal space which second space zone A2 is adjacent to the first space zone A1 are partitioned by the partition wall 75. In the present embodiment, as illustrated in FIG. 6, the partition wall 75 includes a basal portion 75b, which is formed integrally with the transmission case 3 and includes a notched portion 75a; and an upper portion forming member 75c, which is supported on the basal portion 75b and configured to close the notched portion 75a and form an upper portion 75t of the partition wall 75. Although the partition wall 75 may be formed totally integrally with the transmission case 3, the partition wall 75 may be attached to the transmission case 3.

As illustrated in FIGS. 5 and 6, an upper space 76 to establish communication between the first space zone A1 and the second space zone A2 is disposed above the partition wall 75. When the rear wheel differential mechanism 22 outputs a forward movement power, the ring gear 22b is driven in a rotation direction indicated by an arrow Z in FIG. 5, and is configured so that the lubricating oil located in the first space zone A1 can flow through the upper space 76 into the second space zone A2 by being scooped up by a tooth part of the ring gear 22b. Specifically, the lubricating oil scooped up by rotation of the ring gear 22b flows in the second space zone A2 through a portion located below the operation clutch 71 in the upper space 76 and portions located on two lateral sides of the operation clutch 71 in the upper space 76.

As illustrated in FIGS. 5 and 6, the flow-out path 86 to establish communication between the second space zone A2 and the first space zone A1 is disposed at a portion located below the upper space 76. In the present embodiment, the flow-out path 86 is configured by a through hole disposed in the partition wall 75. If a position of an oil surface of the lubricating oil staying in the second space zone A2 is higher than a position of an oil surface of the lubricating oil staying in the first space zone A1, the lubricating oil located in the second space zone A2 can flow out through the flow-out path 86 into the first space zone A1 by a head difference between the lubricating oil located in the second space zone A2 and the lubricating oil located in the first space zone A1.

[Area Adjustment Part, Wall Adjustment Part]

As illustrated in FIGS. 5 and 6, the partition wall 75 includes an area adjustment part 100, which is capable of adjusting a circulation area of the flow-out path 86; and a wall adjustment part 110, which is capable of adjusting lifting and lowering of the upper portion 75t of the partition wall 75.

Specifically, as illustrated in FIG. 6, the area adjustment part 100 includes an area adjustment member 101 and an area adjustment motor 102 as an actuator connected to the area adjustment member 101. The area adjustment motor 102 is configured by an electric motor. The area adjustment member 101 is slidably supported on a first guide rail 103 included in the basal portion 75b in the partition wall 75. The area adjustment member 101 and the area adjustment motor 102 are connected to each other by engaging a screw shaft 104 drivably disposed in the area adjustment motor 102 and a screw hole (not illustrated) included in the operation section 105 in the area adjustment member 101. A portion of the screw shaft 104 which is located on a side opposite to the area adjustment motor 102 with respect to the operation section 105 is rotatably and slidably supported on a support part 106 in the area adjustment member 101.

The screw shaft 104 is driven by the area adjustment motor 102, and the operation section 105 is subjected to a movement operation by the screw shaft being rotated in the area adjustment part 100. If the operation section 105 is subjected to the movement operation in a direction away from the area adjustment motor 102, the area adjustment member 101 is guided on the first guide rail 103 and is subjected to a slide operation in a direction to enter the flow-out path 86, and an area (circulation area) where the lubricating oil can be circulated in the flow-out path 86 is adjusted to a narrow side by the area adjustment member 101. If the operation section 105 is subjected to a movement operation in a direction toward the area adjustment motor 102, the area adjustment member 101 is guided on the first guide rail 103 and is subjected to a slide operation in a direction away from the flow-out path 86, and the area (circulation area) where the lubricating oil can be circulated in the flow-out path 86 is adjusted to a wide side by the area adjustment member 101.

Specifically, as illustrated in FIG. 6, the wall adjustment part 110 includes the upper portion forming member 75c to form the upper portion 75t of the partition wall 75, and an upper portion adjustment motor 111 as an actuator connected to the upper portion forming member 75c. The upper portion adjustment motor 111 is configured by an electric motor. The upper portion forming member 75c is slidably supported on the second guide rail 112 disposed at portions on two lateral sides of the notched portion 75a of the basal portion 75b on the partition wall 75. The upper portion forming member 75c and the upper portion adjustment motor 111 are connected to each other by engaging a screw shaft 113 drivably disposed in the upper portion adjustment motor 111 and a screw hole (not illustrated) included in the operation section 114 disposed in the upper portion forming ember 75c. A portion of the screw shaft 113 which is located on a side opposite to the upper portion adjustment motor 111 with respect to the operation section 114 is rotatably and slidably supported on a support part 115 in the upper portion forming member 75c.

In the wall adjustment part 110, the screw shaft 113 is driven by the upper portion adjustment motor 111, and the operation section 114 is subjected to a movement operation by the screw shaft 113 being rotated. If the operation section 114 is subjected to a movement operation in a direction away from the upper portion adjustment motor 111, the upper portion forming member 75c is subjected to a lifting operation by being guided by the second guide rail 112, and a height position of the upper portion 75t in the partition wall 75 is adjusted to a high side by the upper portion forming member 75c. If the operation section 114 is subjected to a movement operation in a direction toward the upper portion adjustment motor 111, the upper portion forming member 75c is subjected to a lowering operation by being guided by the second guide rail 112, and the height position of the upper portion 75t in the partition wall 75 is adjusted to a low side by the upper portion forming member 75c.

As illustrated in FIG. 6, a lubrication control device 120 is linked to the area adjustment motor 102 of the area adjustment part 100 and the upper portion adjustment motor 111 of the wall adjustment part 110. An oil temperature sensor 121 to detect a temperature of the lubricating oil located inside the transmission case 3, and a vehicle speed sensor to detect a traveling speed of a vehicle body are linked to the lubrication control device 120.

The lubrication control device 120 is configured using a microcomputer. The lubrication control device 120 includes a first area setting section 123, a second area setting section 124, a first height setting section 125, and a second height setting section 126. The first area setting section 123 stores a predetermined relationship between a lubricating oil temperature and a circulation area scale as a set circulation area. The second area setting section 124 stores a predetermined relationship between a vehicle velocity and the circulation area scale as a set circulation area. The third height setting section 125 stores a predetermined relationship between the lubricating oil temperature and the high position of the upper portion 75t as a set height position. The second height setting section 126 stores a predetermined relationship between the vehicle velocity and the height position of the upper portion 75t as a set height position.

The lubrication control device 120 obtains a circulation area corresponding to a detected oil temperature detected by the oil temperature sensor 121 from the set circulation area stored in the first area setting section 123, and outputs an operation command to adjust circulation area to the obtained circulation area to the area adjustment part 100 so as to activate the area adjustment part 100. The lubrication control device 120 obtains a height position of the upper portion 75t in the partition wall 75 which corresponds to the detected oil temperature detected by the oil temperature sensor 121, from the set height position stored in the first height setting section 125, and outputs an operation command to adjust the height position of the upper portion 75t in the partition wall 75 to the obtained height position, to the wall adjustment part 110 so as to activate the wall adjustment part 110.

The lubrication control device 120 obtains a circulation area corresponding to the detective vehicle speed detected by the vehicle speed sensor from the set circulation area stored in the second area setting section 124, and outputs an operation command to adjust the circulation area to the obtained circulation area to the area adjustment part 100 so as to activate the area adjustment part 100. The lubrication control device 120 obtains a height position of the upper portion 75t in the partition wall 75 which corresponds to the detected vehicle speed detected by the vehicle speed sensor 122, from the set height position stored in the second height setting section 126, and outputs an operation command to adjust the height position of the upper portion 75t in the partition wall 75 to the obtained height position, to the wall adjustment part 110 so as to activate the wall adjustment part 110.

[Guide Member]

Figure 7:
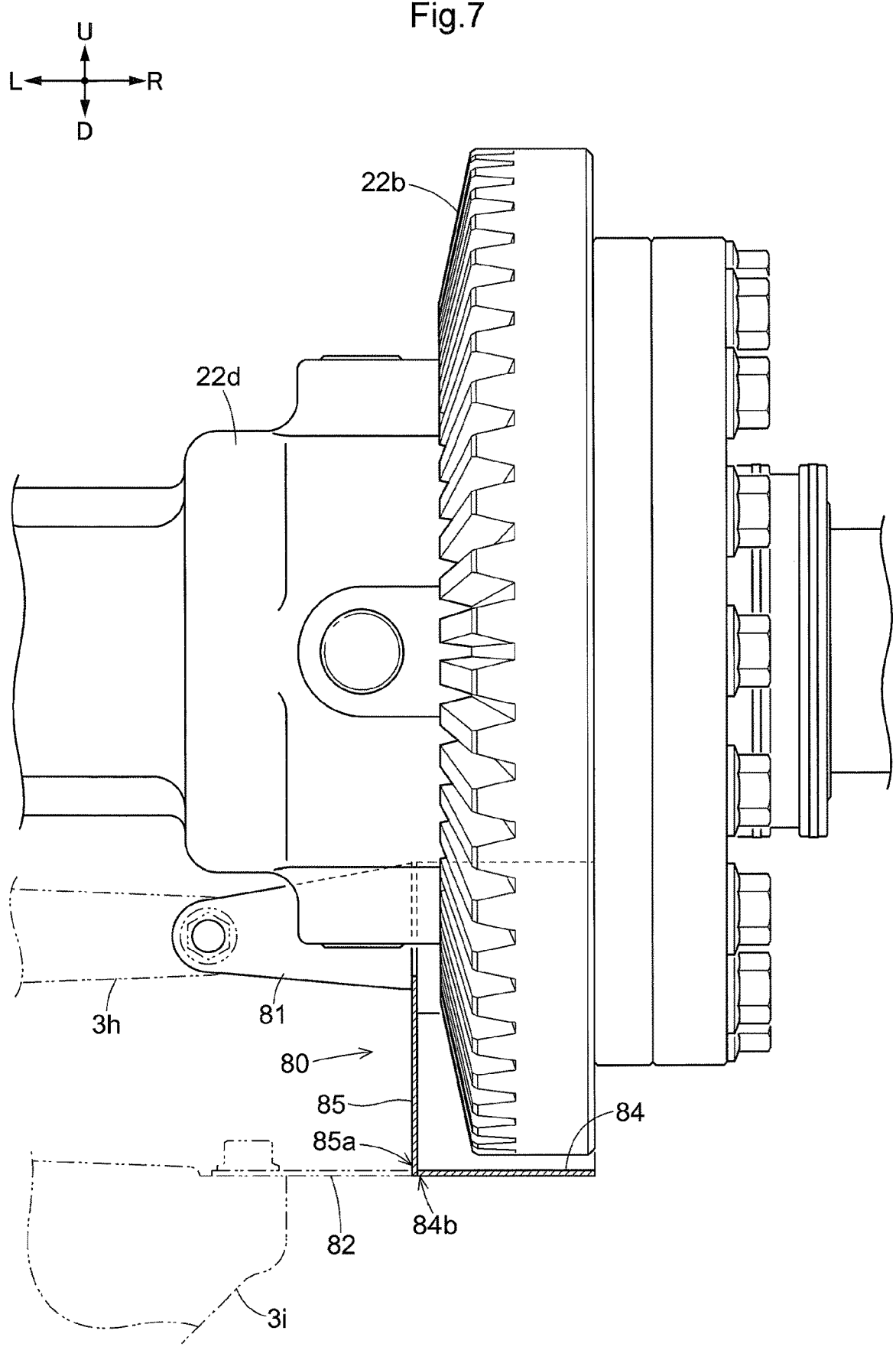
FIG. 7 is a rear view illustrating a rear wheel differential mechanism and a guide member.
Figure 8:
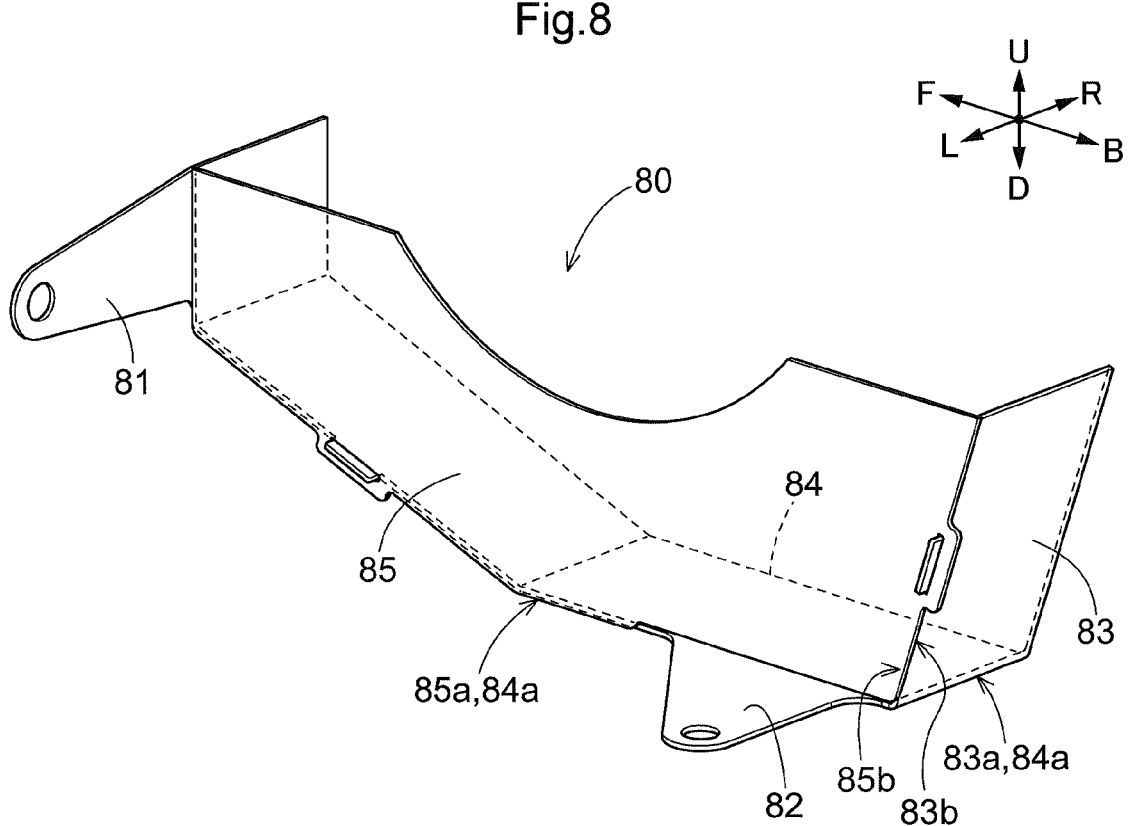
FIG. 8 is a perspective view of the guide member.

A guide member 80, which guides the lubricating oil stirred by the ring gear 22b toward above the partition wall 75, is disposed below the first space zone A1 as illustrated in FIGS. 5 and 7. A front connection arm 81 is disposed in a front portion of the guide member 80 in the vehicle body front-back direction, and a rear connection arm 82 is disposed in a rear portion of the guide member 80 in the vehicle body front-back direction as illustrated in FIG. 8. In the guide member 80, the front connection arm 81 is connected to a support part 3h included in the transmission case 3 by a connection bolt, and the rear connection arm 82 is supported on the transmission case 3 by being connected to a support part 3i included in the transmission case 3 by a connection bolt as illustrated in FIG. 7.

As illustrated in FIG. 8, the guide member 80 includes a first guide part 83 disposed in a vertically-directed attitude at a rear end portion of the guide member 80 in the vehicle body front-back direction, a second guide part 84 disposed on a bottom portion of the guide member 80, and a third guide part 85 disposed in the vertically-directed attitude at an end portion of the guide member 80 in a vehicle body lateral direction.

As illustrated in FIG. 5, the first guide part 83 can be disposed in the vertically-directed attitude between a lower portion of the ring gear 22b and the partition wall 75 because the guide member 80 is supported on the transmission case 3. The lubricating oil scooped up by the ring gear 22b is guided by the first guide part 83 so as to flow toward above the partition wall 75.

As illustrated in FIGS. 5 and 7, because the guide member 80 is supported on the transmission case 3, the second guide part 84 can be disposed below the ring gear 22b so as to extend in a rotation direction of the ring gear 22b. The lubricating oil stirred by the ring gear 2b is guided by the second guide part 84 so as to flow toward the first guide part 83. As illustrated in FIGS. 5 and 8, an end portion 84a of the second guide part 84 on a downstream side of the rotation direction of the ring gear 22b is connected to a lower end portion 83a of the first guide part 83, and therefore the lubricating oil flowing toward the first guide part 83 does not leak from between the second guide part 84 and the first guide part 83.

As illustrated in FIGS. 5 and 7, because the guide member 80 is supported on the transmission case 3, the third guide part 85 can be disposed at a position opposed to one of two lateral portions in a lower portion of the ring gear 22b at which the tooth part of the ring gear 22b is located, so as to extend in the rotation direction of the ring gear 22b. The lubricating oil stirred by the ring gear 22b is guided by the second guide part 84 so as to flow toward the first guide part 83. As illustrated in FIGS. 7 and 8, an end portion 85a of the third guide part 85 located toward the second guide part is connected to a lateral end portion 84b of the second guide part 84 located toward the third guide part, and an end portion 85b of the third guide part 85 which is located on a downstream side of the rotation direction of the ring gear 22b is connected to a lateral end portion 83b of the first guide part 83 located toward the third guide part. Therefore, the lubricating oil flowing toward the first guide part 83 does not leak from between the third guide part 85 and the second guide part 84, and from between the third guide part 85 and the first guide part 83.

When the rear wheel differential mechanism 22 transmits forward movement power, the lubricating oil is stirred by the ring gear 22b being rotated, and the lubricating oil flows from the first space zone A1 via the upper space 76 into the second space zone A2 is guided by being guided by the guide member 80. During high-speed traveling, the rotational velocity of the ring gear 22b is higher than that during low-speed traveling, and the lubricating oil is stirred by the ring gear 22b. In some cases, an amount of the lubricating oil flowing from the first space zone A1 via the upper space 76 into the second space zone A2 becomes larger than an amount of the lubricating oil flowing from the second space zone A2 via the flow-out path 86 into the first space zone A1.

A rotational velocity of the ring gear 22b during the low-speed traveling is lower than that during the high-speed traveling, and the lubricating oil is stirred by the ring gear 22b. There occurs a decrease in the amount of the lubricating oil flowing from the first space zone A1 via the upper space 75 into the second space zone A2 by being guided by the guide member 80. Depending on the rotational velocity of the ring gear 22b, even though the lubricating oil located in the first space zone A1 is stirred by the ring gear 22b, the stirred lubricating oil may not reach the upper space 76, failing to flow into the second space zone A2. Accordingly, the amount of the lubricating oil staying in the second space zone A2 is less likely to become larger the amount of the lubricating oil flowing from the second space zone A2 via the flow-out path 86 into the first space zone A1.

The lubricating oil has a lower viscosity with increasing temperature of the lubricating oil, and the lubricating oil stirred by the ring gear 22b tends to flow in the second space zone A2. And, at the same time, the lubricating oil tends to circulate the flow-out path 86. Therefore, if a height position of the upper portion 75t of the partition wall 75 and a circulation area of the flow-out path 86 are kept constant, a volume of the first space zone A1 and a volume of the second space zone A2 become unstable depending on the temperature of the lubricating oil. However, with the present embodiment, the lubrication control device 120 adjusts the circulation area in the flow-out path 86 to a circulation area having a size corresponding to the temperature of the lubricating oil by controlling the area adjustment part 100 on the basis of the detected oil temperature obtained from the oil temperature sensor 121. At the same time, the lubrication control device 120 adjusts the height position of the upper portion 75t of the partition wall 75 to a height position corresponding to the temperature of the lubricating oil by controlling the wall adjustment part 110 on the basis of the detected oil temperature obtained from the oil temperature sensor 121. Consequently, irrespective of a temperature change in the lubricating oil, it is easy to adjust the amount of lubricating oil staying in the second space zone A2 and the amount of the lubricating oil flowing from the second space zone A2 into the first space zone A1 to an amount suitable for the temperature of the lubricating oil.

The rotational velocity of the ring gear 22b increases with increasing the traveling speed, thereby increasing the amount of the lubricating oil flowing in the second space zone A2 by being scooped up by the ring gear 22b. In other words, the rotational velocity of the ring gear 22b decreases with decreasing the traveling speed, and even though the lubricating oil is scooped up by the ring gear 22b, the lubricating oil is less likely to go up higher and flow in the second space zone A2. Additionally, a change in the amount of the lubricating oil flowing in the second space zone A2 causes a change in the head difference between the lubricating oil in the second space zone A2 and the lubricating oil in the first space zone A1, and the amount of the lubricating oil passing through the flow-out path 86 is likely to change. Therefore, if the height position of the upper portion 75t of the partition wall 75 and the circulation area of the flow-out path 86 are kept constant, the volume of the first space zone A1 and the volume of the second space zone A2 become unstable depending on the traveling speed. However, with the present embodiment, the lubrication control device 120 adjusts the circulation area in the flow-out path 86 to a circulation area having a size corresponding to the vehicle speed by controlling the area adjustment part 100 on the basis of the detected vehicle speed obtained from the vehicle speed sensor 122. At the same time, the lubrication control device 120 adjusts the height position of the upper portion 75t of the partition wall 75 to a height position corresponding to the vehicle speed by controlling the wall adjustment part 110 on the basis of the detected vehicle speed obtained from the vehicle speed sensor 122. Consequently, irrespective of the change in the vehicle speed, it is easy to adjust the amount of lubricating oil staying in the second space zone A2 and the amount of the lubricating oil flowing from the second space zone A2 into the first space zone A1 to an amount suitable for the vehicle speed.

Figure 9:
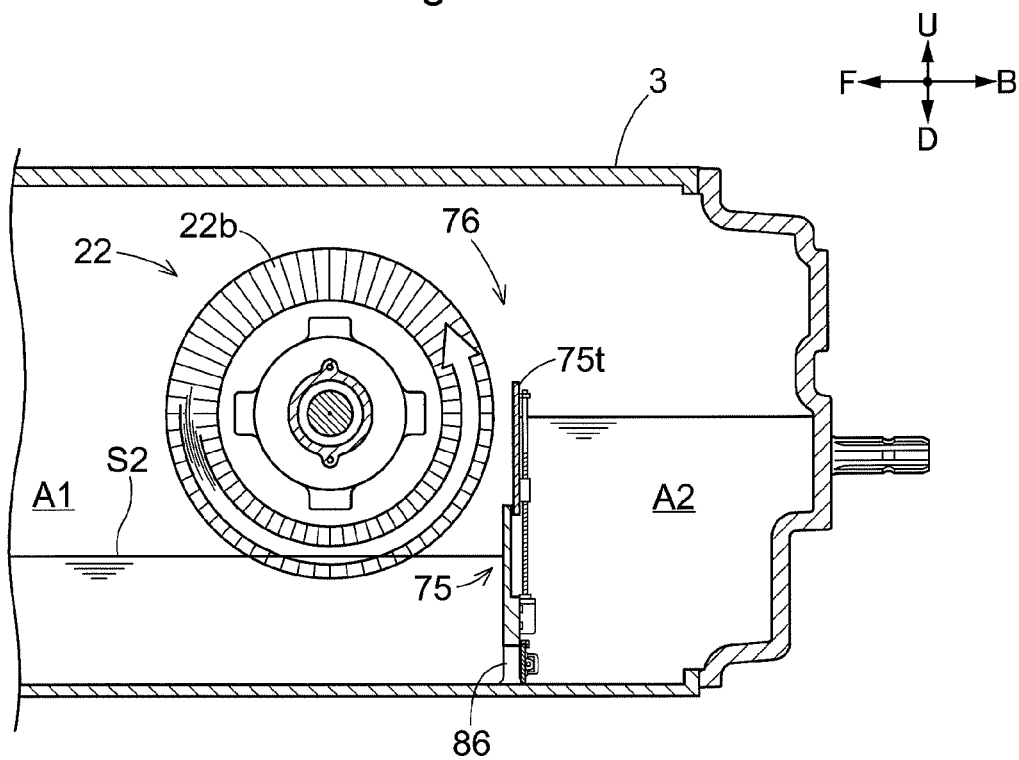
FIG. 9 is a sectional view illustrating an accumulated state of a lubricating oil during high-speed traveling.
Figure 10:
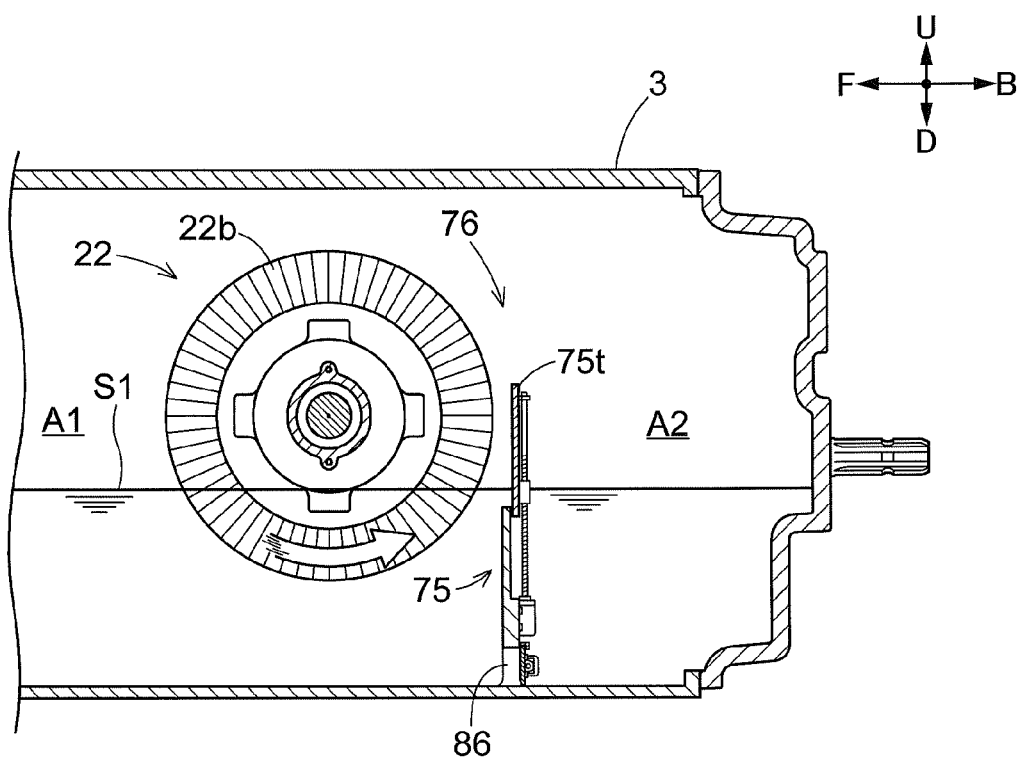
FIG. 10 is a sectional view illustrating an accumulated state of the lubricating oil during low-speed traveling.

FIG. 9 is a sectional view illustrating an accumulated state of the lubricating oil during high-speed traveling. FIG. 10 is a sectional view illustrating an accumulated state of the lubricating oil during low-speed traveling. As illustrated in FIGS. 9 and 10, a position of an oil surface S1 of the lubricating oil in the first space zone A1 during the low-speed traveling is higher than a position of an oil surface S2 of the lubricating oil in the first space zone A1 during the high-speed traveling, and the rear wheel differential mechanism 22 during the low-speed traveling enters deeper than during the high-speed traveling. Consequently, the rear wheel differential mechanism 22 can be sufficiently lubricated during the low-speed traveling. The position of the oil surface S2 of the lubricating oil in the first space zone A1 during the high-speed traveling is lower than the position of the oil surface S1 in the first space zone A1 during the low-speed traveling, and the rear wheel differential mechanism 22 during the high-speed traveling enters the lubricating oil shallowerly than during the low-speed traveling. This reduces resistance received by the rear wheel differential mechanism 22 due to stirring of the lubricating oil during the high-speed traveling, thereby reducing loss of driving force.

An actuating clutch 71 is disposed in an upper portion of the second space zone A2 as illustrated in FIG. 5. The actuating clutch 71 is capable of switching between: an engaged state in which the power from the engine 1 is transmitted to the power take-off shaft 14; and a disengaged state in which the power transmission from the engine 1 to the power take-off shaft 14 is discontinued.

The actuating clutch 71 is configured by a wet multi-plate friction clutch. A lubrication circuit (not illustrated) including a lubrication pipe (not illustrated) disposed outside the transmission case 3 or a lubrication pipe (not illustrated) externally fitted on the rear rotating shaft 32 is configured to supply the lubricating oil for cooling purposes to the actuating clutch 71. The lubricating oil supplied to the actuating clutch 71 drips from, for example, the notched portion in a clutch case 71a of the actuating clutch 71. The dripped lubricating oil enters the second space zone A2 and flows out of the second space zone A2 and passes through the flow-out path 86 into the first space zone A1. The lubricating oil dripped from the actuating clutch 71 can be supplied to the rear wheel differential mechanism 22 as a lubricating oil.

As illustrated in FIG. 5, the second space zone A2 includes the operation power transmission mechanism 72 as a gear interlock mechanism for interlocking the actuating clutch 71 and the power take-off shaft 14. The operation power transmission mechanism 72 is configured by a gear transmission that varies the power from the actuating clutch 71 and transmits the varied power to the power take-out shaft 14. The operation power transmission mechanism 72 is lubricated by the lubricating oil staying in the second space zone A2.

Figure 11:
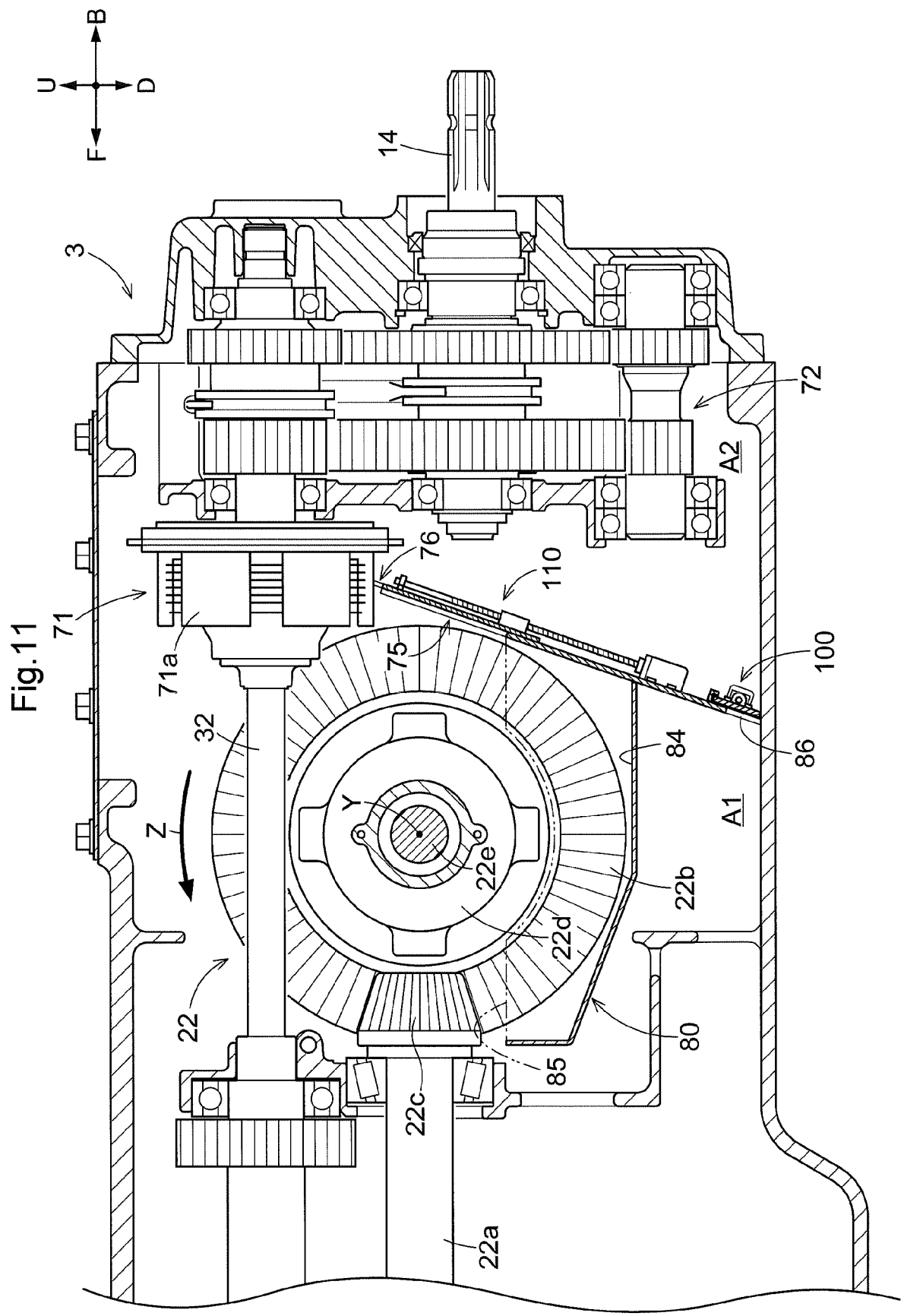
FIG. 11 is a side view illustrating a lubrication device in another embodiment.

OTHER EMBODIMENTS (1) FIG. 11 is a side view illustrating a lubrication device in another embodiment. In the lubrication device of this embodiment, the partition wall 75 is inclined to carry out a guide to cause the lubricating oil stirred by the ring gear 22b to flow toward the second space zone A2 as illustrated in FIG. 11. The partition wall 75 serves as a guide means in place of the first guide part 83 illustrated in FIG. 5 and the like.

Figure 12:
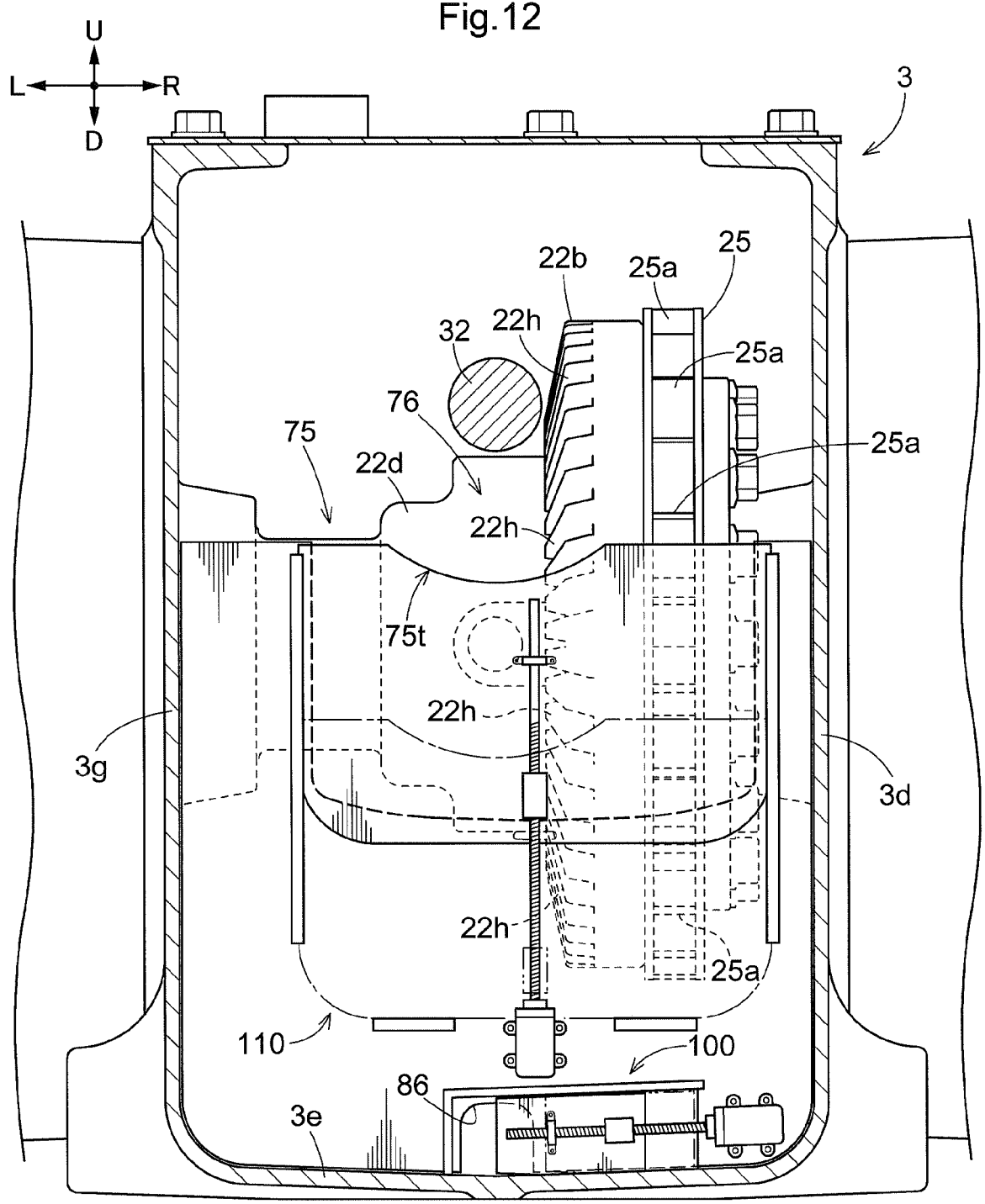
FIG. 12 is a rear view illustrating a lubrication device of still another embodiment.

(2) FIG. 12 is a rear view illustrating a lubrication device of still another embodiment. In the lubrication device of this embodiment, the ring gear 22b includes an oil feeding part 25 different from the tooth part 22h as illustrated in FIG. 12. The oil feeding part 25 is rotated by rotation of the ring gear 22b, and is configured to feed the lubricating oil staying in the first space zone A1 toward the second space zone A2. Specifically, the oil feeding part 25 includes a plurality of throwing impellers 25a arranged at intervals along the entire circumference of the ring gear 22b on a lateral portion opposite to a side where the tooth part 22h of the ring gear 22b is located, and the lubricating oil is scooped by the individual throwing impellers 25a, and the scooped lubricating oil is thrown toward the second space zone A2.

(3) The foregoing embodiment exemplifies the case of employing the area adjustment part 100 using the slidable area adjustment member 101 and the area adjustment motor 102. This configuration, however, is not intended in a limiting sense. For example, an area adjustment part 100 may be employed which uses, for example, a variable throttle valve, a flow rate adjustment valve and operated hydraulic pressure.

Alternatively, the area adjustment part 100 may not be included. The amount of the lubricating oil fed from the first space zone A1 to the second space zone A2 can be anticipated to a certain extent according to a traveling speed. That is, the amount of the lubricating oil flowing in the second space zone A2 depends on the traveling speed. The amount of the lubricating oil returning from the second space zone A2 to the first space zone A1 depends on the circulation area of the flow-out path 86. Using the foregoing relationships, the circulation area of the flow-out path 86 can be preset so that the amount of the lubricating oil in the first space zone A1 can be maintained at an appropriate amount. Thus, even if the area adjustment part 100 is not included, the amount of the lubricating oil in the first space zone A1 may be maintained at the appropriate amount according to the traveling speed by adjusting the circulation area of the flow-out path 86 to the appropriate area. Consequently, in some cases, the rear wheel differential mechanism 22 may enter deeply into the lubricating oil during the low-speed traveling, and the rear differential mechanism 22 can enter shallowly into the lubricating oil during the high-speed traveling.

(4) Although the foregoing embodiment exemplifies the case of including the wall adjustment part 110, the wall adjustment part 110 may not be included.

(5) Although the foregoing embodiment exemplifies the case of disposing the operating clutch 71 above the second space zone A2, the operation clutch 71 may not be disposed in the upper portion of the second space zone A2.

(6) Although the foregoing embodiment exemplifies the case of disposing the operation power transmission mechanism 72 in the second space zone A2, the operation power transmission mechanism 72 may not be disposed in the second space zone A2.

(7) Although the foregoing embodiment exemplifies the case of including the first guide part 83, the second guide part 84 and the third guide part 85, none of the first guide part 83, the second guide part 84 and the third guide part 85 may be included, or alternatively only the first guide part 83 may be included.

(8) Although the foregoing embodiment exemplifies the case of disposing the engine 1 as a power source, an electric motor may be employed as the power source.

(9) Although the foregoing embodiment exemplifies the case of disposing the rear wheels 7 as a traveling device, a crawler traveling device, a combination of wheels and a mini-crawler may be employed as the traveling device.

INDUSTRIAL APPLICABILITY

The present invention is applicable to a work vehicle including a gear transmission that varies the power from a power source and outputs the varied power, and a differential mechanism which includes a ring gear rotatable around a rotation axis along a horizontal direction, and transmits the power inputted from the gear transmission to a traveling device.

REFERENCE SIGNS LIST

1 Engine (power source)
3 Transmission case
7 Rear wheels (traveling device)
14 Power take-off shaft
15M Gear transmission
22 Rear wheel differential mechanism (differential mechanism)
22b Ring gear
22h Tooth part
25 Oil feeding part
71 Clutch (operation clutch)
72 Operation power transmission mechanism (gear interlock mechanism)
75 Partition wall
75t Upper portion
76 Upper space
83 First guide part
83a Lower end portion
83b Lateral end portion
84 Second guide part
84a End portion
84b Lateral end portion
85 Third guide part
85a Lateral end portion
85b End portion
86 Flow-out path
100 Area adjustment part
110 Wall adjustment part
A1 First space zone
A2 Second space zone
Y Rotation axis

The invention claimed is:
1. A work vehicle, comprising:
a gear transmission configured to vary power from a power source and output the varied power;
a differential mechanism including a ring gear rotatable around a rotation axis along a horizontal direction, the differential mechanism being configured to transmit the power inputted from the gear transmission to a traveling device;
a transmission case containing the gear transmission and the differential mechanism;
a first space zone as part of an internal space of the transmission case in which first space zone the differential mechanism is located;

a second space zone as part of the internal space which the second space zone is adjacent to the first space zone;

a partition wall separating the first space zone and the second space zone;

an upper space disposed above the partition wall and configured to allow lubricating oil scooped up from the first space zone by rotation of the ring gear to flow in the second space zone;

a flow-out path disposed below the upper space and configured to allow the lubricating oil staying in the second space zone to flow out to the first space zone;

an area adjustment part configured to adjust a circulation area of the flow-out path; and a wall adjustment part configured to adjust lifting and lowering of an upper portion of the partition wall.

2. The work vehicle according to claim 1, further comprising:

a first guide part disposed in a vertically-directed attitude between the ring gear and the partition wall, the first guide part being configured to guide the lubricating oil stirred by the ring gear toward above the partition wall.

3. The work vehicle according to claim 2, further comprising a second guide part disposed below the ring gear in a state of extending in a rotation direction of the ring gear, the second guide part being configured to guide the lubricating oil stirred by the ring gear toward the first guide part, wherein an end portion of the second guide part which the end portion is located in a downstream side in the rotation direction of the ring gear is connected to a lower end portion of the first guide part.

4. The work vehicle according to claim 3, further comprising:

a third guide part disposed, in a state of extending in the rotation direction of the ring gear, at a position opposed to one of two lateral portions of a lower portion of the ring gear which the lateral portion is located on a side on which a tooth part of the ring gear is located, the third guide part being configured to guide the lubricating oil stirred by the ring gear toward the first guide part, an end portion of the third guide part which the end portion is located toward the second guide part is connected to a lateral end portion of the second guide part which the lateral end portion is located toward the third guide part, and an end portion of the third guide part which is located on a downstream side of the rotation direction of the ring gear is connected to a lateral end portion of the first guide part which the lateral end portion is located toward the third guide part.

5. The work vehicle according to claim 1, wherein the partition wall is disposed in an inclined attitude to guide the lubricating oil stirred by the ring gear toward the second space zone.

6. The work vehicle according to claim 1, further comprising an oil feeding part disposed separately from a tooth part in the ring gear and configured to feed lubricating oil staying in the first space zone toward the second space zone.

7. The work vehicle according to claim 1, further comprising:

a clutch disposed in an upper portion of the second space zone and configured to switch between: an engaged state in which the power from the power source is transmitted to a power take-off shaft; and a disengaged state in which power transmission from the power source to the power take-off shaft is discontinued.

8. The work vehicle according to claim 7, further comprising:

a gear interlock mechanism disposed in the second space zone and configured to interlock the clutch and the power take-off shaft.

* * * * *